United States Patent [19]

Schildhorn

[11] Patent Number: 4,858,164

[45] Date of Patent: Aug. 15, 1989

[54] COMPLEX ARITHMETIC PROCESSING

[75] Inventor: Alan W. Schildhorn, East Northport, N.Y.

[73] Assignee: United Technologies Corporation, Hartford, Conn.

[21] Appl. No.: 56,627

[22] Filed: May 29, 1987

[51] Int. Cl.4 .............................................. G06F 7/38
[52] U.S. Cl. ..................... 364/736; 364/726
[58] Field of Search ................ 364/736, 200, 726, 754

[56] References Cited

U.S. PATENT DOCUMENTS

| 3,800,130 | 3/1974 | Martinson et al. | 364/748 X |
|---|---|---|---|
| 4,128,890 | 12/1978 | Irwin et al. | 364/724 |
| 4,354,249 | 10/1982 | King et al. | 364/754 |
| 4,491,910 | 1/1985 | Caudel et al. | 364/200 |
| 4,547,862 | 10/1985 | McIver et al. | 364/726 |
| 4,760,549 | 7/1988 | du Chen et al. | 364/726 |
| 4,791,590 | 12/1988 | Ku et al. | 364/726 |

Primary Examiner—Gary V. Harkcom
Assistant Examiner—Tan V. Mai
Attorney, Agent, or Firm—Eric W. Petraske

[57] ABSTRACT

An integrated circuit chip for performing arithmetic calculations on complex numbers including a bidirectional input/output section for switching the direction of data flow on external buses, a multiplier and two adders located on two intersecting data paths, on which a mix of simultaneous and serial operations are performed.

13 Claims, 23 Drawing Sheets

EXPRESSION:  D1 = A1
             D2 = A2
             D3 = A3
             D4 = A4

| CYCLE<br>REG | 3 | 0 | 1 | 2 | 3 | 0 | 1 | 2 | 3 | 0 | 1 | 2 |
|---|---|---|---|---|---|---|---|---|---|---|---|---|
| R1 |  |  | A2 |  | A4 |  |  |  |  |  |  |  |
| R7 |  |  |  |  | A2 |  | A4 |  |  |  |  |  |
| R10 |  |  |  |  |  |  | A2 |  | A4 |  |  |  |
| R2 |  | A1 |  | A3 |  |  |  |  |  |  |  |  |
| R8 |  |  |  | A1 |  | A3 |  |  |  |  |  |  |
| R11 |  |  |  |  |  | A1 |  | A3 |  |  |  |  |
| R3 |  |  |  |  |  |  |  |  |  |  |  |  |
| R4 |  |  |  |  |  |  |  |  |  |  |  |  |
| R5 |  |  |  |  |  |  |  |  |  |  |  |  |
| R6 |  |  |  |  |  |  |  |  |  |  |  |  |
| R9 |  |  |  |  |  |  |  |  |  |  |  |  |
| R12 |  |  |  |  |  |  |  |  |  |  |  |  |
| R13 |  |  |  |  |  |  |  |  |  |  |  |  |
| R14 |  |  |  |  |  |  |  |  |  |  |  |  |
| R15 |  |  |  |  |  |  |  |  |  |  |  |  |
| R16 |  |  |  |  |  |  |  |  | A1 | A2 | A3 | A4 |
| R17 |  |  |  |  |  |  |  |  | D1 | D2 | D3 | D4 |

FIG. 2A

EXPRESSION:  D1 = A1
             D2 = A2
             D3 = A3
             D4 = A4

| CYCLE / REG | 3 | 0 | 1 | 2 | 3 | 0 | 1 | 2 | 3 | 0 | 1 | 2 |
|---|---|---|---|---|---|---|---|---|---|---|---|---|
| R1  |   | A1 | A2 | A3 | A4 |   |   |   |   |   |   |   |
| R7  |   |    | A1 | A2 | A3 | A4 |   |   |   |   |   |   |
| R10 |   |    |    | A1 | A2 | A3 | A4 |   |   |   |   |   |
| R2  |   |    |    |    |    |    |    |    |   |   |   |   |
| R8  |   |    |    |    |    |    |    |    |   |   |   |   |
| R11 |   |    |    |    |    |    |    |    |   |   |   |   |
| R3  |   |    |    |    |    |    |    |    |   |   |   |   |
| R4  |   |    |    |    |    |    |    |    |   |   |   |   |
| R5  |   |    |    |    |    |    |    |    |   |   |   |   |
| R6  |   |    |    |    |    |    |    |    |   |   |   |   |
| R9  |   |    |    |    |    |    |    |    |   |   |   |   |
| R12 |   |    |    |    |    |    |    |    |   |   |   |   |
| R13 |   |    |    |    |    |    |    |    |   |   |   |   |
| R14 |   |    |    |    |    |    |    |    |   |   |   |   |
| R15 |   |    |    |    |    |    |    |    |   |   |   |   |
| R16 |   |    |    |    |    |    |    |    |   |   |   |   |
| R17 |   |    |    | D1 | D2 | D3 | D4 |   |   |   |   |   |

*FIG. 2B*

EXPRESSION:
$$DI = AI + [(SI \cdot WI) - (SQ \cdot WQ)]$$
$$DQ = AQ + [(SI \cdot WQ) + (SQ \cdot WI)]$$
$$XI = AI - [(SI \cdot WI) - (SQ \cdot WQ)]$$
$$XQ = AQ - [(SI \cdot WQ) + (SQ \cdot WI)]$$

| CYCLE / REG | 3 | 0 | 1 | 2 | 3 | 0 | 1 | 2 | 3 | 0 | 1 | 2 |
|---|---|---|---|---|---|---|---|---|---|---|---|---|
| R1 | | | | | AQ | | | | | | | |
| R7 | | | | | | | | AQ | | | | |
| R10 | | | | | | | | | | AQ | | |
| R2 | | | | AI | | | | | | | | |
| R8 | | | | | | | AI | | | | | |
| R11 | | | | | | | | | AI | | | |
| R3 | | SI | | | | | | | | | | |
| R4 | | | SQ | | | | | | | | | |
| R5 | | WI | | | | | | | | | | |
| R6 | | | WQ | | | | | | | | | |
| R9 | | | SI·WI | SI·WQ | SQ·WQ | SQ·WI | | | | | | |
| R12 | | | | SI·WI | | | | | | | | |
| R13 | | | | | SI·WQ | | | | | | | |
| R14 | | | | | SI·WI − SQ·WQ | | | | | | | |
| R15 | | | | | | SI·WQ + SQ·WI | | | | | | |
| R16 | | | | | | | | | | | | |
| R17 | | | | | | | | | | XI | XQ | DI | DQ |

FIG. 2C

EXPRESSION:  DI = AI
DQ = AQ
XI = [ (SI · WI) − (SQ · WQ) ]
XQ = [ (SI · WQ) + (SQ · WI) ]

| CYCLE / REG | 3 | 0 | 1 | 2 | 3 | 0 | 1 | 2 | 3 | 0 | 1 | 2 |
|---|---|---|---|---|---|---|---|---|---|---|---|---|
| R1 | | | | | AQ | | | | | | | |
| R7 | | | | | | | | AQ | | | | |
| R10 | | | | | | | | | | AQ | | |
| R2 | | | | AI | | | | | | | | |
| R8 | | | | | | | AI | | | | | |
| R11 | | | | | | | | | AI | | | |
| R3 | | SI | | | | | | | | | | |
| R4 | | | SQ | | | | | | | | | |
| R5 | | WI | | | | | | | | | | |
| R6 | | | WQ | | | | | | | | | |
| R9 | | | SI·WI | SI·WQ | SQ·WQ | SQ·WI | | | | | | |
| R12 | | | | SI·WI | SI·WI − SQ·WQ | | | | | | | |
| R13 | | | | | SI·WQ | SI·WQ + SQ·WI | | | | | | |
| R14 | | | | | | SI·WI − SQ·WQ | | | | | | |
| R15 | | | | | | SI·WQ + SQ·WI | | | | | | |
| R16 | | | | | | | | | | | | |
| R17 | | | | | | | | | XI | XQ | DI | DQ |

FIG. 2D

EXPRESSION:  DI = AI
DQ = AQ
XI = Σ [ (SI · WI) - (SQ · WQ) ]
XQ = Σ [ (SI · WQ) + (SQ · WI) ]

| CYCLE / REG | 3 | 0 | 1 | 2 | 3 | 0 | 1 | 2 | 3 | 0 | 1 | 2 |
|---|---|---|---|---|---|---|---|---|---|---|---|---|
| R1  |   |   |   |   | AQ |   |   |   |   |   |   |   |
| R7  |   |   |   |   |   |   |   | AQ |   |   |   |   |
| R10 |   |   |   |   |   |   |   |   |   | AQ |   |   |
| R2  |   |   |   | AI |   |   |   |   |   |   |   |   |
| R8  |   |   |   |   |   |   | AI |   |   |   |   |   |
| R11 |   |   |   |   |   |   |   |   | AI |   |   |   |
| R3  |   |   | SI |   |   |   |   |   |   |   |   |   |
| R4  |   |   |   | SQ |   |   |   |   |   |   |   |   |
| R5  |   |   | WI |   |   |   |   |   |   |   |   |   |
| R6  |   |   |   | WQ |   |   |   |   |   |   |   |   |
| R9  |   |   | SI·WI | SI·WQ | SQ·WQ | SQ·WI |   |   |   |   |   |   |
| R12 |   |   |   | R12 + SI·WI |   | R12 - SQ·WQ |   |   |   |   |   |   |
| R13 |   |   |   |   | R13 + SI·WQ |   | R13 + SQ·WI |   |   |   |   |   |
| R14 |   |   |   |   |   | XI |   |   |   |   |   |   |
| R15 |   |   |   |   |   |   | XQ |   |   |   |   |   |
| R16 |   |   |   |   |   |   |   |   |   |   |   |   |
| R17 |   |   |   |   |   |   |   |   | XI | XQ | DI | DQ |

*FIG. 2E*

EXPRESSION:  
D1 = A1 · W1  
D2 = A2 · W2  
D3 = A3 · W3  
D4 = A4 · W4

| CYCLE\REG | 3 | 0 | 1 | 2 | 3 | 0 | 1 | 2 | 3 | 0 | 1 | 2 |
|---|---|---|---|---|---|---|---|---|---|---|---|---|
| R1 | | | | | | | | | | | | |
| R7 | | | | | | | | | | | | |
| R10 | | | | | | | | | | | | |
| R2 | | | | | | | | | | | | |
| R8 | | | | | | | | | | | | |
| R11 | | | | | | | | | | | | |
| R3 | | A1 | A2 | A3 | A4 | | | | | | | |
| R4 | | | | | | | | | | | | |
| R5 | | W1 | W2 | W3 | W4 | | | | | | | |
| R6 | | | | | | | | | | | | |
| R9 | | | A1·W1 | A2·W2 | A3·W3 | A4·W4 | | | | | | |
| R12 | | | | | | | | | | | | |
| R13 | | | | | | | | | | | | |
| R14 | | | | | | | | | | | | |
| R15 | | | | A1·W1 | A2·W2 | A3·W3 | A4·W4 | | | | | |
| R16 | | | | | | | | | | | | |
| R17 | | | | | D1 | D2 | D3 | D4 | | | | |

*FIG. 2F*

EXPRESSION: $D = \Sigma(A \cdot W)$

| CYCLE<br>REG | 3 | 0 | 1 | 2 | 3 | 0 | 1 | 2 | 3 | 0 | 1 | 2 |
|---|---|---|---|---|---|---|---|---|---|---|---|---|
| R1 | | | | | | | | | | | | |
| R7 | | | | | | | | | | | | |
| R10 | | | | | | | | | | | | |
| R2 | | | | | | | | | | | | |
| R8 | | | | | | | | | | | | |
| R11 | | | | | | | | | | | | |
| R3 | | A1 | A2 | A3 | A4 | | | | | | | |
| R4 | | | | | | | | | | | | |
| R5 | | W1 | W2 | W3 | W4 | | | | | | | |
| R6 | | | | | | | | | | | | |
| R9 | | | A1·W1 | A2·W2 | A3·W3 | A4·W4 | | | | | | |
| R12 | | | | | | | | | | | | |
| R13 | | | | | | | | | | | | |
| R14 | | | | | | | | | | | | |
| R15 | | | | A1·W1 | A2·W2 | A3·W3 | A4·W4 | | | | | |
| R16 | | | | | R16+A1·W1 | R16+A2·W2 | R16+S3·W3 | R16+S4·W4 | | | | |
| R17 | | | | | D | D | D | D | | | | |

*FIG. 2G*

EXPRESSION:
XI = ABS [ (SI · WI) - (SQ · WQ) ]
XQ = ABS [ (SI · WQ) + (SQ · WI) ]
D  = MAX [ (XI + XQ/2), (XI/2 + XQ) ]

| REG \ CYCLE | 3 | 0 | 1 | 2 | 3 | 0 | 1 | 2 | 3 | 0 | 1 | 2 |
|---|---|---|---|---|---|---|---|---|---|---|---|---|
| R1 | | | | | | | | | | | | |
| R7 | | | | | | | | | | | | |
| R10 | | | | | | | | | | | | |
| R2 | | | | | | | | | | | | |
| R8 | | | | | | | | | | | | |
| R11 | | | | | | | | | | | | |
| R3 | | SI | | | | | | | | | | |
| R4 | | | SQ | | | | | | | | | |
| R5 | | WI | | | | | | | | | | |
| R6 | | | WQ | | | | | | | | | |
| R9 | | | SI·WI | SI·WQ | SQ·WQ | SQ·WI | | | | | | |
| R12 | | | | SI·WI | SI·WI − SQ·WQ | | | | | | | |
| R13 | | | | | SI·WQ | SI·WQ + SQ*WI | | | | | | |
| R14 | | | | | | SI·WI − SQ·WQ | | | | | | |
| R15 | | | | | | SI·WQ + SQ·WI | | | | | | |
| R16 | | | | | | | | | | D | | |
| R17 | | | | | | | | XI+$\frac{XQ}{2}$ | XQ+$\frac{XI}{2}$ | | | |

CONDITIONAL WRITE:
STORED ONLY IF
GREATER THAN LAST
VALUE

FIG. 2I

EXPRESSION:
$$XI = ABS \, \Sigma \, [ \, (SI \cdot WI) - (SQ \cdot WQ) \, ]$$
$$XQ = ABS \, \Sigma \, [ \, (SI \cdot WQ) + (SQ \cdot WI) \, ]$$
$$D = MAX \, [ \, (XI + XQ/2), \, (XI/2 + XQ) \, ]$$

| CYCLE / REG | 3 | 0 | 1 | 2 | 3 | 0 | 1 | 2 | 3 | 0 | 1 | 2 |
|---|---|---|---|---|---|---|---|---|---|---|---|---|
| R1 |  |  |  |  |  |  |  |  |  |  |  |  |
| R7 |  |  |  |  |  |  |  |  |  |  |  |  |
| R10 |  |  |  |  |  |  |  |  |  |  |  |  |
| R2 |  |  |  |  |  |  |  |  |  |  |  |  |
| R8 |  |  |  |  |  |  |  |  |  |  |  |  |
| R11 |  |  |  |  |  |  |  |  |  |  |  |  |
| R3 |  | SI |  |  |  |  |  |  |  |  |  |  |
| R4 |  |  | SQ |  |  |  |  |  |  |  |  |  |
| R5 |  | WI |  |  |  |  |  |  |  |  |  |  |
| R6 |  |  | WQ |  |  |  |  |  |  |  |  |  |
| R9 |  |  | SI·WI | SI·WQ | SQ·WQ | SQ·WI |  |  |  |  |  |  |
| R12 |  |  |  | R12 + SI·WI |  | R12 − SQ·WQ |  |  |  |  |  |  |
| R13 |  |  |  |  | R13 + SI·WQ |  | R13 + SQ·WI |  |  |  |  |  |
| R14 |  |  |  |  |  | R12 − SQ·WQ |  |  |  |  |  |  |
| R15 |  |  |  |  |  |  | R13 + SQ·WI |  |  |  |  |  |
| R16 |  |  |  |  |  |  |  |  |  |  |  |  |
| R17 |  |  |  |  |  |  |  | $XI + \frac{XQ}{2}$ | $XQ + \frac{XI}{2}$ |  |  |  |

CONDITIONAL WRITE: ↑
STORED ONLY IF
GREATER THAN LAST
VALUE

FIG. 2J

EXPRESSION:
XI = ABS [ (SI · WI) - (SQ · WQ) ]
XQ = ABS [ (SI · WQ) + (SQ · WI) ]
D1 = MAX [ (XI + XQ/2), (XI/2 + XQ) ]
D2 = Σ D1

| CYCLE / REG | 3 | 0 | 1 | 2 | 3 | 0 | 1 | 2 | 3 | 0 | 1 | 2 |
|---|---|---|---|---|---|---|---|---|---|---|---|---|
| R1 | | | | | | | | | | | | |
| R7 | | | | | | | | | | | | |
| R10 | | | | | | | | | | | | |
| R2 | | | | | | | | | | | | |
| R8 | | | | | | | | | | | | |
| R11 | | | | | | | | | | | | |
| R3 | | SI | | | | | | | | | | |
| R4 | | | SQ | | | | | | | | | |
| R5 | | WI | | | | | | | | | | |
| R6 | | | WQ | | | | | | | | | |
| R9 | | SI·WI | SI·WQ | SQ·WQ | SQ·WI | | | | | | | |
| R12 | | | SI·WI | | SI·WI − SQ·WQ | | | | | | | |
| R13 | | | | SI·WQ | SI·WQ + SQ·WI | | | | | | | |
| R14 | | | | | SI·WI − SQ·WQ | | | | | | | |
| R15 | | | | | | SI·WQ + SQ·WI | | | | | | |
| R16 | | | | | | | | | | R16 + D1 | | |
| R17 | | | | | | | | XI + $\frac{XQ}{2}$ | XQ + $\frac{XI}{2}$ | D2 | | |

CONDITIONAL WRITE: ↑
STORED ONLY IF
GREATER THAN LAST
VALUE

FIG. 2K

EXPRESSION:
$$XI = ABS \, \Sigma \, [ \, (SI \cdot WI) - (SQ \cdot WQ) \, ]$$
$$XQ = ABS \, \Sigma \, [ \, (SI \cdot WQ) + (SQ \cdot WI) \, ]$$
$$D1 = MAX \, [ \, (XI + XQ/2), \, (XI/2 + XQ) \, ]$$
$$D2 = \Sigma \, D1$$

| CYCLE / REG | 3 | 0 | 1 | 2 | 3 | 0 | 1 | 2 | 3 | 0 | 1 | 2 |
|---|---|---|---|---|---|---|---|---|---|---|---|---|
| R1 | | | | | | | | | | | | |
| R7 | | | | | | | | | | | | |
| R10 | | | | | | | | | | | | |
| R2 | | | | | | | | | | | | |
| R8 | | | | | | | | | | | | |
| R11 | | | | | | | | | | | | |
| R3 | | SI | | | | | | | | | | |
| R4 | | | SQ | | | | | | | | | |
| R5 | | WI | | | | | | | | | | |
| R6 | | | WQ | | | | | | | | | |
| R9 | | | SI·WI | SI·WQ | SQ·WQ | SQ·WI | | | | | | |
| R12 | | | | R12 + SI·WI | | R12 − SQ·WQ | | | | | | |
| R13 | | | | | R13 + SI·WQ | | R13 + SQ·WI | | | | | |
| R14 | | | | | | R12 − SQ·WQ | | | | | | |
| R15 | | | | | | | R13 + SQ·WI | | | | | |
| R16 | | | | | | | | | | R16 + D1 | | |
| R17 | | | | | | | | XI+XQ/2 | XQ+XI/2 | D2 | | |

CONDITIONAL WRITE: ↑
STORED ONLY IF
GREATER THAN LAST
VALUE

EXPRESSION:  XI = ABS (AI)
XQ = ABS (AQ)
D  = MAX [ (XI + XQ/2), (XI/2 + XQ) ]

| CYCLE<br>REG | 3 | 0 | 1 | 2 | 3 | 0 | 1 | 2 | 3 | 0 | 1 | 2 |
|---|---|---|---|---|---|---|---|---|---|---|---|---|
| R1 |  |  | AQ |  |  |  |  |  |  |  |  |  |
| R7 |  |  |  | AQ |  |  |  |  |  |  |  |  |
| R10 |  |  |  |  |  | AQ |  |  |  |  |  |  |
| R2 |  | AI |  |  |  |  |  |  |  |  |  |  |
| R8 |  |  |  | AI |  |  |  |  |  |  |  |  |
| R11 |  |  |  |  |  | AI |  |  |  |  |  |  |
| R3 |  |  |  |  |  |  |  |  |  |  |  |  |
| R4 |  |  |  |  |  |  |  |  |  |  |  |  |
| R5 |  |  |  |  |  |  |  |  |  |  |  |  |
| R6 |  |  |  |  |  |  |  |  |  |  |  |  |
| R9 |  |  |  |  |  |  |  |  |  |  |  |  |
| R12 |  |  |  |  |  |  |  |  |  |  |  |  |
| R13 |  |  |  |  |  |  |  |  |  |  |  |  |
| R14 |  |  |  |  |  |  |  |  |  |  |  |  |
| R15 |  |  |  |  |  |  |  |  |  |  |  |  |
| R16 |  |  |  |  |  |  |  |  |  |  |  |  |
| R17 |  |  |  |  |  |  | $XI+\frac{XQ}{2}$ | $XQ+\frac{XI}{2}$ |  |  |  |  |

CONDITIONAL WRITE:
STORED ONLY IF
GREATER THAN LAST
VALUE

EXPRESSION:
XI = ABS (AI)
XQ = ABS (AQ)
D1 = MAX [ (XI + XQ/2), (XI/2 + XQ) ]
D2 = ΣD1

| CYCLE<br>REG | 3 | 0 | 1 | 2 | 3 | 0 | 1 | 2 | 3 | 0 | 1 | 2 |
|---|---|---|---|---|---|---|---|---|---|---|---|---|
| R1 |  |  | AQ |  |  |  |  |  |  |  |  |  |
| R7 |  |  |  | AQ |  |  |  |  |  |  |  |  |
| R10 |  |  |  |  |  | AQ |  |  |  |  |  |  |
| R2 |  | AI |  |  |  |  |  |  |  |  |  |  |
| R8 |  |  |  | AI |  |  |  |  |  |  |  |  |
| R11 |  |  |  |  |  | AI |  |  |  |  |  |  |
| R3 |  |  |  |  |  |  |  |  |  |  |  |  |
| R4 |  |  |  |  |  |  |  |  |  |  |  |  |
| R5 |  |  |  |  |  |  |  |  |  |  |  |  |
| R6 |  |  |  |  |  |  |  |  |  |  |  |  |
| R9 |  |  |  |  |  |  |  |  |  |  |  |  |
| R12 |  |  |  |  |  |  |  |  |  |  |  |  |
| R13 |  |  |  |  |  |  |  |  |  |  |  |  |
| R14 |  |  |  |  |  |  |  |  |  |  |  |  |
| R15 |  |  |  |  |  |  |  |  |  |  |  |  |
| R16 |  |  |  |  |  |  |  |  | R16+D1 |  |  |  |
| R17 |  |  |  |  |  |  |  | XI+XQ/2 | XQ+XI/2 | D2 |  |  |

CONDITIONAL WRITE: ↑
STORED ONLY IF
GREATER THAN LAST
VALUE

FIG. 2N

EXPRESSION:  XI = ABS (AI)     XQ = ABS (AQ)
             YI = ABS (SI)     YQ = ABS (SQ)

D1 = MAX [ (XI + XQ/2), (XI/2 + XQ) ]
             D2 = MAX [ (YI + YQ/2), (YI/2 + YQ) ]

| REG \ CYCLE | 3 | 0 | 1 | 2 | 3 | 0 | 1 | 2 | 3 | 0 | 1 | 2 |
|---|---|---|---|---|---|---|---|---|---|---|---|---|
| R1  |  |  | AQ |    | SQ |    |    |    |  |  |  |  |
| R7  |  |  |    | AQ |    | SQ |    |    |  |  |  |  |
| R10 |  |  |    |    | AQ |    | SQ |    |  |  |  |  |
| R2  |  | AI | SI |   |    |    |    |    |  |  |  |  |
| R8  |  |    | AI |   | SI |    |    |    |  |  |  |  |
| R11 |  |    |    | AI |   | SI |    |    |  |  |  |  |
| R3  |  |  |  |  |  |  |  |  |  |  |  |  |
| R4  |  |  |  |  |  |  |  |  |  |  |  |  |
| R5  |  |  |  |  |  |  |  |  |  |  |  |  |
| R6  |  |  |  |  |  |  |  |  |  |  |  |  |
| R9  |  |  |  |  |  |  |  |  |  |  |  |  |
| R12 |  |  |  |  |  |  |  |  |  |  |  |  |
| R13 |  |  |  |  |  |  |  |  |  |  |  |  |
| R14 |  |  |  |  |  |  |  |  |  |  |  |  |
| R15 |  |  |  |  |  |  |  |  |  |  |  |  |
| R16 |  |  |  |  |  |  |  |  |  |  |  |  |
| R17 |  |  |  |  | $XI+\frac{XQ}{2}$ | $XQ+\frac{XI}{2}$ | $YI+\frac{YQ}{2}$ | $YQ+\frac{YI}{2}$ |  |  |  |  |

CONDITIONAL WRITE:
STORED ONLY IF
GREATER THAN LAST
VALUE

FIG. 20

EXPRESSION:   D = Σ A

| CYCLE / REG | 3 | 0 | 1 | 2 | 3 | 0 | 1 | 2 | 3 | 0 | 1 | 2 |
|---|---|---|---|---|---|---|---|---|---|---|---|---|
| R1  |   | A1 | A2 | A3 | A4 |   |   |   |   |   |   |   |
| R7  |   |   | A1 | A2 | A3 | A4 |   |   |   |   |   |   |
| R10 |   |   |   | A1 | A2 | A3 | A4 |   |   |   |   |   |
| R2  |   |   |   |   |   |   |   |   |   |   |   |   |
| R8  |   |   |   |   |   |   |   |   |   |   |   |   |
| R11 |   |   |   |   |   |   |   |   |   |   |   |   |
| R3  |   |   |   |   |   |   |   |   |   |   |   |   |
| R4  |   |   |   |   |   |   |   |   |   |   |   |   |
| R5  |   |   |   |   |   |   |   |   |   |   |   |   |
| R6  |   |   |   |   |   |   |   |   |   |   |   |   |
| R9  |   |   |   |   |   |   |   |   |   |   |   |   |
| R12 |   |   |   |   |   |   |   |   |   |   |   |   |
| R13 |   |   |   |   |   |   |   |   |   |   |   |   |
| R14 |   |   |   |   |   |   |   |   |   |   |   |   |
| R15 |   |   |   |   |   |   |   |   |   |   |   |   |
| R16 |   |   |   |   |   |   |   |   |   |   |   |   |
| R17 |   |   |   |   | R17+A1 | R17+A2 | R17+A3 | R17+A4 |   |   |   |   |

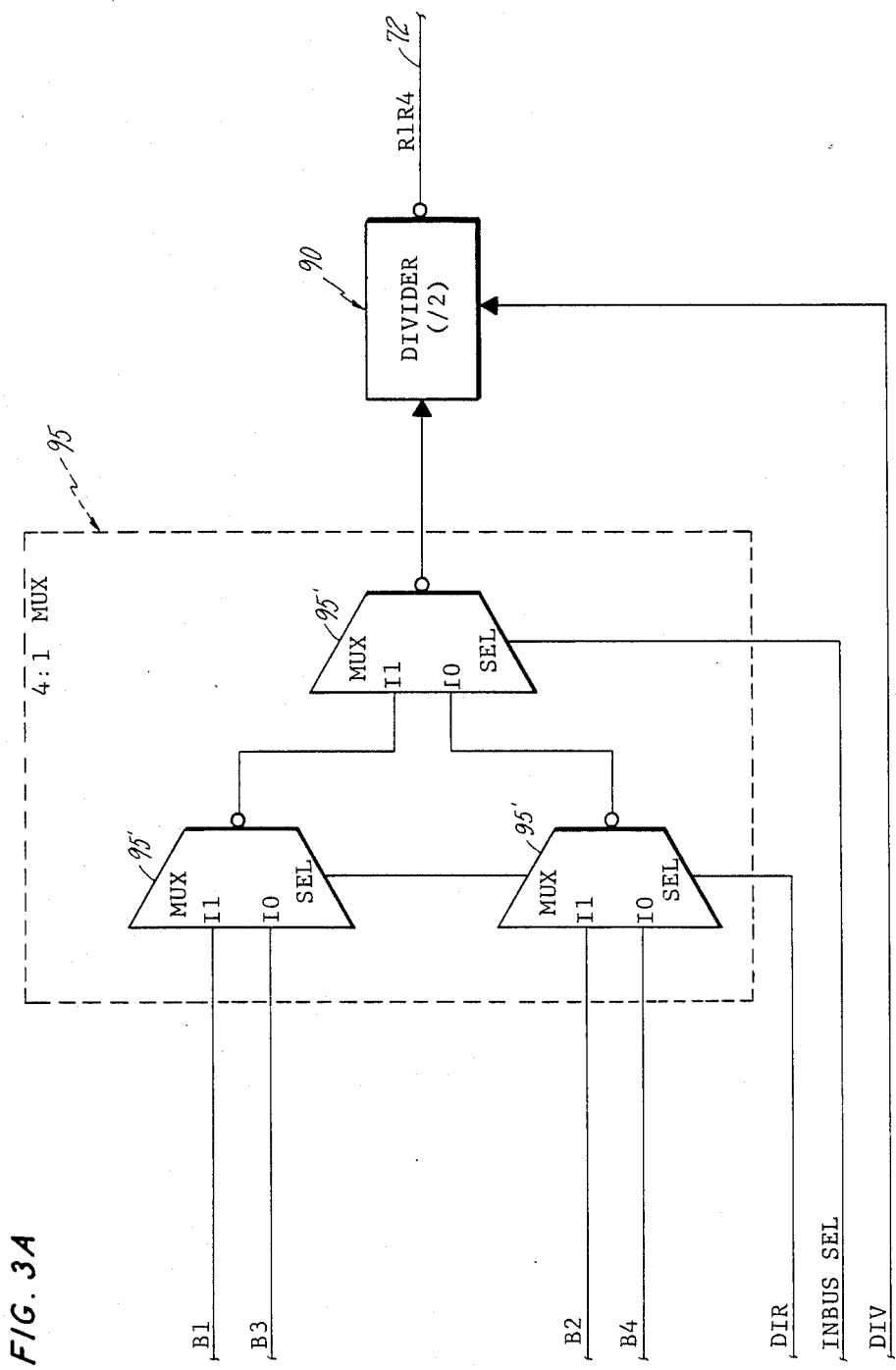

| DIR | MODE | CYC<1:0> | INBUS_SEL | INPUT BUS |
|---|---|---|---|---|
| 0 | 0 | 3 | 1 | B3 |
| 0 | 0 | 0 | 1 | B3 |
| 0 | 0 | 1 | 0 | B4 |
| 0 | 0 | 2 | 0 | B4 |
| 0 | 1 | 3 | 0 | B4 |
| 0 | 1 | 0 | 0 | B4 |
| 0 | 1 | 1 | 1 | B3 |
| 0 | 1 | 2 | 1 | B3 |
| 1 | 0 | 3 | 1 | B1 |
| 1 | 0 | 0 | 1 | B1 |
| 1 | 0 | 1 | 0 | B2 |
| 1 | 0 | 2 | 0 | B2 |
| 1 | 1 | 3 | 0 | B2 |
| 1 | 1 | 0 | 0 | B2 |
| 1 | 1 | 1 | 1 | B1 |
| 1 | 1 | 2 | 1 | B1 |

*FIG. 5*

8 CYCLE INSTRUCTIONS

12 CYCLE INSTRUCTIONS

COMPLEX ARITHMETIC PROCESSING

DESCRIPTION

1. Technical Field

The technical field of this invention is that complex arithmetic and in particular, that of accomplishing complex arithmetic operations in a generalized signal processing arrangement.

2. Background Art

Signal and image processing techniques employed in complex electronic systems in operation today frequently demand the performance of complex arithmetic operations including, for example, Fast Fourier Transforms (FFT's) upon selected complex signal combinations or numbers.

In particular, such complex arithmetic is accomplished during signal and image processing and includes the execution of such functions as simple pass and real fast pass operation upon a selected pair of input complex numbers or signals, the accomplishment of Radix-two butterfly operation, complex multiplication, complex multiply accumulation, real multiplication, real multiply accumulation, complex multiply magnitude conversion, complex multiply accumulate magnitude conversion, complex multiply magnitude convert accumulation, complex multiply accumulate magnitude convert accumulation, magnitude conversion, magnitude convert accumulation, double cycle magnitude conversion, and real accumulation.

By way of further detail, the simple passage operation begins with a pair of complex signals or numbers A1+jA2 and A3+jA4, each including a real and an imaginary part, and produces them identically several cycles later. Real fast pass operation performs the same function in a predetermined shorter number of cycles.

The Radix-two butterfly operation produces two output complex numbers for example, designated DI+jDQ and XI+jXQ, each of them having a real and an imaginary portion, the respective output complex numbers being the function of three input complex numbers AI+jAQ, SI+jSQ, and WI+jWQ. In particular, the real part DI of the first output number equals the real part AI of a first selected input complex number plus the difference of products of the real components SI and WI of second and third selected respective input signals or numbers, less the product of the imaginary portions SQ and WQ of second and third selected respective input numbers. The imaginary portion DQ of the first output number equals the imaginary portion AQ of the first input signal plus the sum of the products of the real portion SI of the second input number times the imaginary portion WQ of the third input signal plus the product of the imaginary portion SQ of the second input number times the real portion WI of the third input number. The real portion XI of the second output number equals the real portion AI of the first input number minus the difference of products of the real portion SI of the second input number times the real portion WI of the third input number minus the product of the imaginary portion SQ of the second input number times the imaginary portion WQ of the third input number. Finally, the imaginary portion XQ of the second output number is equal to the imaginary portion AQ of the first input number minus the sum of products of the real portion SI of the second input number times the imaginary portion WQ of the third input number plus the product of the imaginary portion SQ of the second input signal times the real portion WI of the third input signal.

Complex multiplication conventionally is accomplished by producing the real and imaginary portions of a first input signal or number AI +jAQ as the respective real and imaginary portions of a first output signal, producing a second complex output number having a real portion equal to the difference of the products of the real portion of a second input number times the real portion of a third number less the product of the imaginary portions of the second and third input signals, and establishing an imaginary portion equal to the sum of the products of the real portion of the second input number times the imaginary portion of the third input signal plus the imaginary portion of the second input signal times the real portion of the third input signal.

Complex multiply accumulation generally known to be is accomplished in a similar fashion to conventional complex multiplication, with the real portion of the first output signal being equal to the real portion of the first input signal, and the imaginary portion of the first output signal being equal to the imaginary portion of the first input signal. However, the real portion of the second output signal is equal to selected sums of product differences, the products being of the real portions of the second and third input signals minus the product of the imaginary portions of the second and third input signals. Further, the imaginary portion of the second output signal is equal to selected sums of product sums of the real portion of the second input signal times the imaginary portion of the third input signal plus the imaginary portion of the second input signal times the real portion of the third input signal or the equivalent.

Real multiplication is accomplished by multiplying corresponding parts of two real numbers and producing an output real number resulting therefrom.

Real multiply accumulation as generally known is accomplished by repeatedly summing products of real multiplications upon the results of a prior cycle of real multiplication.

Complex multiply magnitude convert operation is accomplished by selecting the maximum of first and second constructed quantities, these being the sum of a first real portion of a constructed complex number plus half of the imaginary portion of the first constructed number, and the second quantity being the real portion of the first constructed number divided by two plus the imaginary portion of the first constructed signal, where the real portion of the first constructed number is equal to the absolute value of the difference of products of the real portion of the second input signal times the real portion of the third input signal minus the product of the imaginary portion of the second input signal times the imaginary portion of the third input signal; and the imaginary portion of the first constructed signal being equal to the absolute value of the sum of products including the real portion of the second input signal times the imaginary portion of the third input signal plus the imaginary portion of the second input signal times the real portion of the third input signal.

Complex multiply accumulate magnitude conversion is accomplished by producing the output signal equal to the maximum of the two values, these being the sums respectively of the real portion of a constructed complex signal plus the imaginary portion of the same number divided by two, and sum of half the real portion of the constructed signal divided by two plus the entire imaginary portion of the same signal, where real portion of the constructed signal is equal to the absolute value of the difference between products of the real portion of the second and third input signals minus the product of the imaginary portion of the second signal times the imaginary portion of the third signal, and where the imaginary portion of the constructed signal is equal to the absolute value of the sum of the products of the real portion of the second signal times the imaginary portion of the third signal portion plus the product of the imaginary portion of the second signal times the real portion of the third signal portion.

Next, complex multiply magnitude convert accumulation is generally accomplished by producing an output signal equal to the sum of a maximum of a real constructed signal portion plus one half of the imaginary portion of the constructed signal, and half the real portion of the constructed signal plus the entire imaginary portion of the constructed signal, where the constructed signal has a real portion equal to the absolute value of the difference of products comprising the real portion of a first input signal times the real portion of another input signal minus the product of the imaginary portions of the first and the other input signal, and the imaginary portion of the constructed signal is equal to the absolute value of the sum of products comprising the real portion of the first signal times the imaginary portion of the other signal plus the imaginary portion of the first signal times the real portion of the other signal.

Further, complex multiply accumulate magnitude convert accumulation is accomplished by producing an output signal equal to the sum of a maximum of a real constructed signal imaginary plus half imaginary portions and half real plus full imaginary constructed signal portions, and selected accumulated sums thereof, where the real portion of the constructed signal is equal to the absolute value of a selected number of sums of product differences of a real first signal portion times a real other signal portion minus the imaginary signal portions of the first and other input signals, and the imaginary portion of the constructed signal is equal to the absolute value of a selected number of sums of the sum of products of the real first signal portion times the imaginary other signal portion plus the imaginary first signal portion times the real other input signal portion.

Further, magnitude convert operation is achieved in producing the maximum of sums of a real constructed signal portion plus half of the imaginary constructed signal portion, and the sum of half the constructed signal real portion plus the entire imaginary constructed signal portion, where the constructed signal real portion equals the absolute value of a first input signal real portion and the constructed signal imaginary portion equals the absolute value of the first signal imaginary portion.

Magnitude convert accumulation operation is achieved by establishing an output signal equaling the sum of the maximum of sums of a real constructed signal portion plus half the imaginary constructed signal portion, and half the constructed signal real portion plus the entire imaginary constructed signal portion, where the constructed signal real portion equals the absolute value of a first input signal real portion and the constructed signal imaginary portion equals the absolute value of the first signal imaginary portion.

Double cycle magnitude conversion as generally known is accomplished by establishing an output signal equaling the maximum value of a first constructed real signal portion plus half the imaginary signal portion thereof and half the real portion thereof plus the entire imaginary portion thereof, and another output signal equal to the maximum value of a real second constructed signal portion plus the imaginary portion thereof divided by two, and the real portion thereof divided by two plus the entire imaginary portion thereof, where the real portion of the first constructed signal is equal to the absolute value of a real first input signal portion, and the imaginary portion of the first constructed signal is equal to the absolute value of the first input signal imaginary portion, and the real portion of the second constructed signal is the absolute value of the real portion of a second input signal, and the imaginary portion of the second constructed signal is the absolute value of the imaginary portion of the second input signal.

Finally, real accumulation is known generally to be accomplished by establishing an output signal equal to a selected number of sum of input signals.

Conventional dedicated signal processors commonly achieve high speed by performing operations in parallel, using wide word formats. A complex multiply operation, for example, would conventionally be speeded up by the use of four multipliers operating in parallel.

Conventional processors also typically have a one-way data path, so that memory controllers and data path controllers are required to feed data back from an output to an input for iterative processing. In each pass of a multi-pass FFT, for example, the input and output memories have to be redirected to and from the arithmetic element.

Conventional signal processors also typically perform single groups of operations for each set of memory accesses, with the data being returned to memory after the operations are performed.

U.S. Pat. No. 4,491,910 illustrates a single-chip microcomputer that could be programmed to perform a number of complex arithmetic calculations. Since this is a general-purpose computer, it will not be configured for the requirements of complex arithmetic and will need to access memory more frequently than a customized chip would need to do.

U.S Pat. No. 4,547,862 illustrates a specialized integrated circuit for performing a fast Fourier transform. The circuit performs one of the functions performed by the present invention but, in addition to limited capability, also has a different architecture. The chip illustrated in the '862 patent appears to be based on the von Neuman architecture, since it has to return to RAM to move data along a single-track data path between the various arithmetic units. For example, the multiplier and multiplicand must be loaded into multiplier unit 12a sequentially along bus 116.

DISCLOSURE OF INVENTION

The invention relates to an integrated-circuit arithmetic processor chip for performing both complex and real arithmetic operations at high speed and with a small amount of hardware, by employing a set of parallel data paths within the chip and also by employing sequential operations within a data path.

A feature of the invention is sequential access to and from the chip for the real and imaginary parts of a complex number; together with a sequential multiplication operation sequence for complex multiplication in a first data path, together with parallel operations in a second data path.

Another feature of the invention is a set of bidirectional input/output data buses for connecting sets of identical processor chips directly together.

Yet another feature of the invention is the use of a sequential complex multiplier and a complex adder in a first data path and a second complex adder intersecting the first and second data paths.

Yet another feature of the invention is the use of reconfigurable chips in a chip array to perform at least two different arithmetic operations using two switchable hardware configurations of the same chip array, so that the same array can perform an FFT and be dynamically reconfigured to perform a DFT.

According to the invention herein, a complex arithmetic processing arrangement effective for signal and image processing including complex arithmetic operations has been developed. The complex arithmetic processing arrangement comprises a multiplier means for combining portions of two complex signals or numbers by multiplying the complex number portions which are input along first and second input lines provided to the multiplier means, each of the multiplier input lines being capable of receiving signal or number portions from a corresponding input register of predetermined size or capacity. The indicated multiplier means further includes a multiplier output connected through a register means for storing the results of multiplication. That register is connected to a first adder means for adding input complex signals and numbers from the multiplier and, according to one version of the invention, the adder output is connected to a feedback register for accumulation of numerical or signal values from the output of said adder by passing output signals from the first adder means back again for addition or subtraction with another input to said first adder means. Further, the output of the first adder means is connected through additional register means for data storage through controllable divide by two means to the respective inputs of a second or additional adder means for adding selected numbers or signals. The additional adder means has an output side that is further provided with a feedback register means for accomplishing signal accumulation of the adder output in the same general fashion as the first adder means. Finally, according to one version of the invention, the output of the additional adder means is connected to a comparator means and includes register means for enabling comparison of selected numbers or signals from said second adder means.

According to the invention herein, a Radix-two butterfly operation can be implemented in complex arithmetic with first and second variable complex numbers and a predetermined fixed complex number with an arrangement comprising an input register, a multiplier, a first adder and an additional adder, a multiplier register, a first output adder register including first and second feedback portions and an additional adder output register means comprising the steps of receiving portions of the selected numbers at corresponding portions of the input register arrangements; establishing a selected cross product and a selected same product of the variable ones of said complex numbers to form a first cross product of portions of said variable complex numbers and a first same kind product; establishing a remaining cross product and a remaining same product of the variable ones of said complex numbers to form a second cross product of portions of said variable complex numbers; subtracting the real same product from the imaginary same product; adding the cross products and storing the results of addition and subtraction in respective portions of the said first adder output register; and finally, adding and subtracting the results of said addition and subtraction from respectively the real and imaginary parts of said fixed complex numbers and producing the results of said final additions and subtractions. According to a further version of the invention, the respective results of said first, same and cross products are stored in respective feedback portions of said first adder feedback portion for accumulation with corresponding ones of said remaining same and cross products.

Other features and advantages of the invention will be apparent from the specification and the claims, and from the accompanying drawing which illustrates a preferred embodiment of the invention.

BRIEF DESCRIPTION OF THE DRAWING

FIGS. 3A through 3D show portions of FIG. 1 in greater detail, particularly showing respectively the input multiplexer, first and second arithmetic sections of the arrangement, and finally the output section thereof.

FIG. 5 is a table of input bus selection requirements for the systolic scheme of FIG. 4B, by direction "DIR" of complex arithmetic processing, and further by mode and cycle of operation.

BEST MODE FOR CARRYING OUT THE INVENTION

Figure 1:
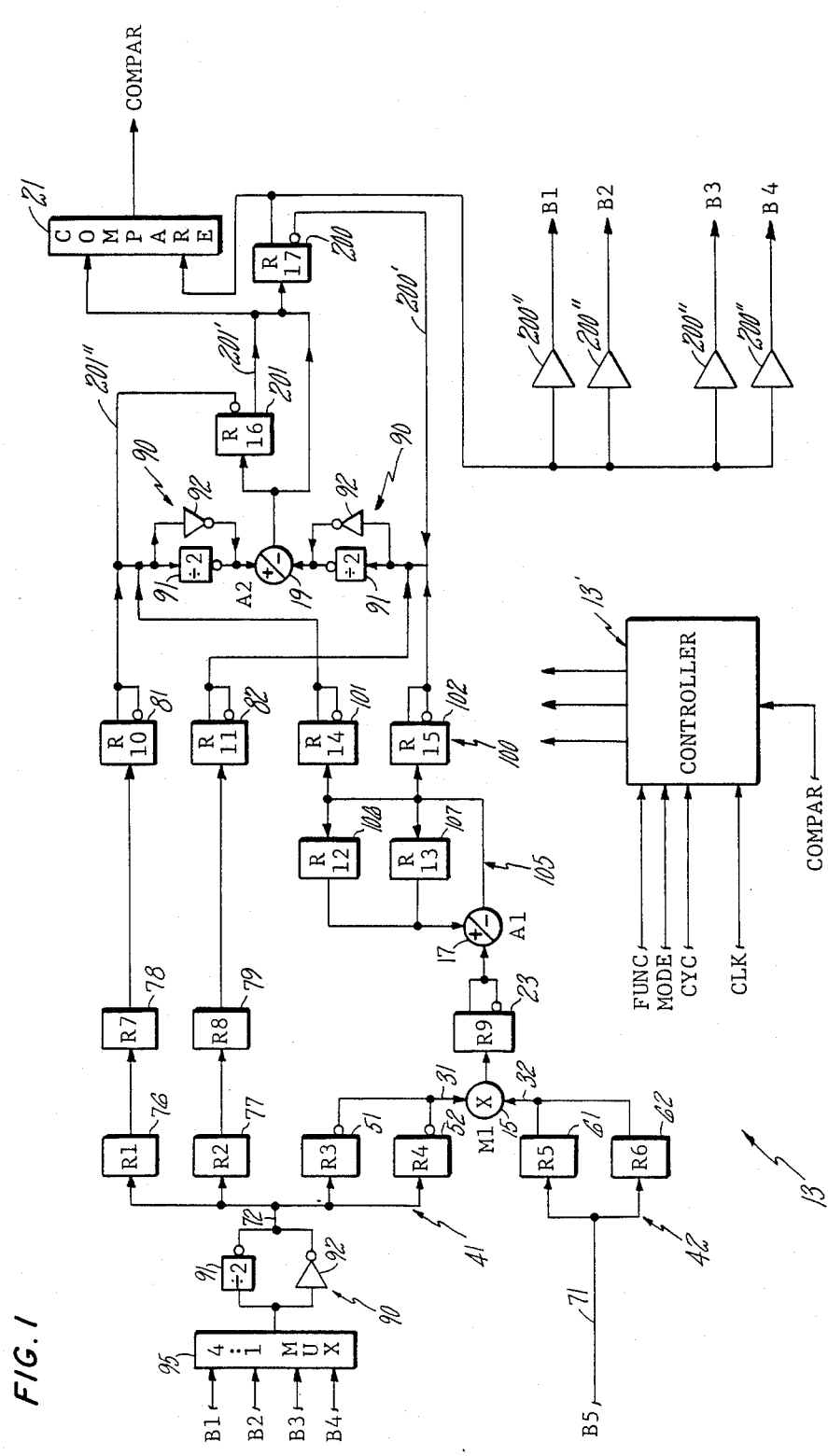
FIG. 1 is a schematic drawing of the complex arithmetic processing element, according to the invention herein.

FIG. 1 shows a schematic complex arithmetic processing element 13 according to the invention herein. The complex element 13 includes a multiplier 15, a first adder means 17 which can selectively engage in addition or subtraction between provided input values, a second adder means 19 which can similarly engage in addition or subtraction between such input values. According to one version of the invention, the arrangement 13 further includes a comparator element 21 as will be discussed below, in order to determine the greatest of several compared numerical values.

The multiplier 15 and the first adder means 17 are connected by a suitable register means 23 capable of holding a predetermined number of bits, and in this case according to a preferred version of the invention, sixteen (16) bits. The signals processed according to a preferred version of the invention herein are typically sixteen (16) bit digital numbers, used in pairs as complex numbers, wherein one sixteen (16) bit number is established as a real number and the other is considered to be a so-called imaginary number. Multiplier 15 has first and second inputs 31 and 32 respectively connected to register means 41 and 42, each of which, according to a version of the invention, includes first and second registers, respectively 51 and 52; 61 and 62. Registers 61 and 62 are in turn provided with a common input 71, and registers 51 and 52 are provided with a common input 72.

Input 72 additionally leads to registers 76 and 77 which in turn successively lead to corresponding registers respectively 78, 79 and then to registers 81 and 82. Registers 78, 79, 81 and 82 are used as delay elements as will be seen. Each of said registers is able to accommodate 16 bits of information, according to a preferred version of the invention.

Both second adder 19 and input 72 are prefaced by suitable elements 90, each including in a schematic representation thereof a divide by two element 91 and a shunting buffer amplifier 92. One of elements 90, in particular the one preceding input registers 51, 52, 61, 62, 76 and 77 is preceded by multiplexer 95. Multiplexer 95 has four input buses, B1 through B4 from a selected RAM memory 101', each of buses B1 through B4 permitting sixteen (16) parallel bits to pass along one of a selected pair of these buses to be entered during one selected period of time into a selected one of registers 51, 52, 61, 62, 76 or 77.

The output of first adder 17 leads to output register means 100 or 105, including respectively, according to one version of the invention, first and second registers 101 and 102, and registers 106 and 107. Output register means 105 is a feedback register, permitting accumulation of numbers through first adder 15.

The outputs of register means 100 including registers 101 and 102 respectively lead to corresponding divide by two elements 90 and then in turn to respective ones of two inputs of second adder 19.

The output of second adder means 19 in turn leads both to output register 200 and then output buffers 200", and additionally to feedback register 201 which is capable of having its contents output into register 200 along line 201', and capable of having its contents fed back into second adder 19 along line 201".

The outputs of respective registers 200 and 201 can be fed into comparator 21 for comparison. Further, the output of register 200 can be fed back to second adder 19 along line 200'.

To accomplish pass operation as suggested in FIG. 2A and according to the invention, the pair of complex numbers to be passed is presented at a selected one of buses B1 through B4 to a 4 by 1 input multiplexer 95 which is shown in considerable detail in FIG. 3A, and from there passes through selectively enablable divider 90. Register R2 (also designated herein as register 77) receives a portion (i.e., A1) of the first complex number during a first cycle of operation, namely cycle zero (0). These operations are of course accomplished under direct supervision of controller 13'. Register R1 then receives the second part A2 of the first complex number A1+jA2 during the second cycle of operation namely cycle one (1). The first part of the first complex number, A1, is then passed on to register R8 and the first part A3 of the second complex number A3+jA4 is delivered to register R2 in a third cycle "2". In the fourth cycle "3", the second part A2 of the first number is delivered to register R7 from register R1 and the last part of the second number A4 is delivered to register R1. Operation then continues in a second group of four cycles with the first part A1 of the first number being delivered to register R11 and the first part A3 of the second number being placed in register R8 in the first cycle of the second group of cycles. During the second cycle of the second group of cycles, the second part A2 of the first number is delivered to register R10 from register R7 and the last part A4 of the second signal is placed in register R7. Further, the first part A3 of the second signal is placed in register R11 as suggested in FIG. 2A. Finally, in the fourth cycle of the second group of cycles, the second part A4 of the second signal is placed in register R10. Additionally, during the third cycle of the second group of cycles, the first part A1 of the first signal is delivered to register R16. Then, during the last cycle of the second group of cycles, the first part A1 of the first signal is produced for output at register R17, while the second part A2 of the first signal is placed in register R16. Then, one cycle later A2 is produced in register R17 for output. Then, the remaining signal portions (A3 and A4), that is the first and second parts of the second signal, are sequentially output through register R17 as suggested in the established scheme.

First and second complex numbers A1+jA2 and A3+jA4 can also be passed through the complex arithmetic processing arrangement 13 in accordance with the invention herein by passing portions thereof sequentially through register R1, R7 and R10 for ultimate production at register R17, as suggested in FIG. 2B. This is accomplished by feeding the first portion A1 of the first signal in successive cycles through registers R1, R7 and R10 and feeding the second part A2 of the first signal through the same registers one cycle later. This same sequence is then followed with the first part A3 of the second signal and then the second part A4 of the second signal. Accordingly, real fast pass operation produces all portions of the selected complex numbers within seven (7) cycles of operation, whereas conventional pass operation requires a complex arithmetic processing operation requiring eleven (11) cycles in total.

Radix-two butterfly operation is accomplished as suggested in FIG. 2C according to the instant invention by introducing the real part SI of a selected complex signal into register R3 of arrangement 13 (as indicated, register R3 is also denoted as register 51, for convenience) and the real part WI of another complex signal into register R5 during a first cycle of operation. During the second cycle of operation, the imaginary portion SQ of the selected signal is introduced into register R4 and the imaginary part WQ of the other signal enters register R6, while the product SIxWI of the real portions of the respective selected numbers is stored in register R9. During the third cycle of operation, the real portion AI of even another number enters register R2, while the product SIxWQ of the real portion of signal SI and the imaginary portion WQ of the other number is stored in register R9 with the former contents of register R9 having already been transferred to register R12 during the same cycle. In the next cycle of operation, the imaginary portion AQ of the final signal enters register R1, the contents of register R9 enter register R13 and the product SQxWQ of the imaginary portions of the selected and final signals is entered into register R9. In the first cycle of a next group of cycles, each group of the cycles including four (4) cycles according to a preferred version of the invention, the contents of first adder output register R12 are subtracted from the contents of multiplier output register R9 and are stored in register R14, and the product SQxWI of the real portion of the final signal times the imaginary portion of the selected signal is entered into register R9. During the second cycle of the second group of cycles, the contents of register R2 are entered into register R8 and the contents of register 13 are added to the contents of register R9 and stored in register R15. In the third cycle of the second group of cycles, the contents of register R1 are entered into register R7. In the next cycle, the contents of register R8 are entered into register R11, and the contents of register R15 are subtracted from register R7 and stored for output in register R17. Next, register R10 receives the contents of register R7 and the difference of the contents of register R7 and register R15 are produced in register R17. During the next cycle, the contents of register R11 plus the contents of register R14 are produced at register R17. Finally, the contents of register R10 are added to the contents of register R15 and produced at register R17.

Complex multiplication is accomplished according to the invention herein by receiving first, second and third complex numbers each having a real and an imaginary part, and transferring the imaginary portion of the first signal in steps first to register R1, then register R7 and finally to register R10 in respectively a fourth cycle of a first group of cycles, and a third cycle of a second group of cycles, and a first cycle of a third group of cycles. The real portion of the first signal is meanwhile transferred first to register R2, then register R8 and finally to register R11 during respectively the third cycle of the first group, the second cycle of the second group of cycles, and the last cycle of the second group of cycles. The real portion of the second number meanwhile is entered into register R3 during the first cycle of the first group, and the imaginary portion of the second number is entered into register R4 during the second cycle of the first group. Further, the real portion of the third number enters register R5 during the first cycle of the first group of cycles, and the imaginary portion of the third signal enters register R6 during the second cycle of the first group. Also, during the second cycle of the first group, a product is taken of the real portion of the second signal and the real portion of the third signal. This product is stored in register R9 and is then transferred to register R12 during the third cycle of the first group of cycles. Register R9 then receives the product of the real portion of the second signal and the imaginary portion of the third signal. This product is transferred to register R13 during the fourth cycle of the first group of cycles. Then, during the same cycle, register R9 receives the product of the imaginary portions of the second and third signals. During the first cycle of the second group of cycles, register R14 receives the difference of register R12 minus register R9, and register R12 receives the difference of register R12 minus register R9, and register R9 receives the product of the imaginary portion of the second signal times the real portion of the third signal. During the next cycle, the sum of registers R13 and R9 is entered into respectively registers R13 and R15. Beginning two cycles later, the contents of first register R12 and then register R13, the contents of first register R13 and then register R15, the contents of first register R11, and then the contents of register R10 are sequentially produced at register R17 in successive cycles.

The operation complex multiply accumulation schedules the real and imaginary portions of the first number through respectively registers R2, R8 and R11 in the cycles indicated in FIG. 2E, and further as indicated therein through registers R1, R7 and R10, respectively. The real and imaginary portions of the second signal are entered as shown in registers R3 and R4. The imaginary and real portions of the third signal are entered respectively in registers R6 and R5 during respective first and second cycles. The products in successive cycles beginning with the second cycle of first the real portions of the second and third signals, the real and imaginary portions of the second and third signals respectively, the imaginary portions of the second and third signals and the imaginary portion of the second signal and the real portion of the third signal are taken and successively stored in register R9 as shown. The current contents of register R12 are added to the contents of register R9 and then placed in register R12 during a third cycle of a first group of cycles. Two cycles later the product of the imaginary portions of the second and third signals is subtracted from the current contents of the register R12 and the result is placed in register R12. One cycle earlier, the product of the real portion of the second signal times the imaginary portion of the third signal are added to the current contents of register R13. Two cycles later, the product of the imaginary portion of the second signal times the real portion of the third signal is added to the current contents of register R13. As indicated in the Figure, the contents of register R13 added further to the contents of register R12 and entered into register R14, and the contents of register R9 are added to the contents of register R13 and placed in register R15. Later, as further suggested in the Figure, the contents of register R14, register R15, register R11 and finally the contents of register R10 are successively output at register R17.

Real multiplication is accomplished as suggested in FIG. 2F according to the invention, by successively entering real numbers in register R3, portion by portion, and concurrently entering successive portions of real numbers into register R5, multiplying corresponding portions of the successive signals or numbers in register R3 and register R5 and successively entering the results into register R9 in a next cycle, and then transferring the successive results in successive cycles into register R15 and finally outputting the products in a next cycle, cycle by cycle, into register R17.

Real multiply accumulate is accomplished in the same fashion as real multiplication, as shown in FIG. 2G, except that the successive products in register R15 are additionally added to the contents of register R16, and are entered into register R16 before being output at register R17.

Figure 2H:
FIGS. 2A through 2O are diagrams illustrating the implementation of indicated complex arithmetic operations in the inventive arrangement of FIG. 1, the diagrams representing each cycle of operation by content of registers utilized to carry selected portions of the complex numbers or signals involved in the particular operation.

The operation complex multiply magnitude conversion is accomplished according to the invention herein as shown in FIG. 2H. The Figure suggests that successive real and imaginary portions of two complex numbers are sequentially entered into register R3, R4, R5 and R6 in first and second cycles of operation. Products of the contents of these registers are taken successively cycle by cycle beginning with the second cycle and entered sequentially into register R9. Register R12 receives the product of the real portion of one signal times the real portion of the other signal during the second cycle of operation. Then, two cycles later, the contents of register R9 are subtracted from the current contents of register R12 with the results being stored in register R12. Additionally, the product established in register R9 during a preceding cycle is transferred into register R13 during the fourth cycle and then is added two cycles later to the product established in register R9 in the preceding cycle. This result is substituted for the existing contents of register R13. Additionally, the final contents of register R12 are entered into register R14. Further, the contents of register R13 are added into register R15 as well. Register R17 in turn receives the sum of absolute value of the real portion of the constructed number plus one half of the absolute value of the imaginary portion of the constructed number during the third cycle of a second group of four cycles established in operation, and one cycle later register R17 receives the sum of the absolute value of the imaginary portion of the constructed number plus one half of the absolute value of the real portion of the constructed number. Finally, register R16 receives the maximum value of the quantities established in the preceding two cycles in register 17.

According to the invention herein, complex multiply accumulate magnitude conversion is effectively implemented as complex multiply magnitude conversion and additionally implements accumulation of the values in register R12 through register R15 as shown in the FIG. 2J.

Further, complex multiply magnitude convert accumulation is implemented according to the invention herein as shown in FIG. 2J, following the general pattern of complex multiply accumulate magnitude conversion, but performing the additional steps indicated at registers R16 and R17.

Figure 2L:

Complex multiply accumulate magnitude convert accumulation as accomplished under the invention addressed and described herein with respect to FIG. 2K, provides a variation in registers R12, R13, R14 and R15 over the implementation of complex multiply magnitude conversion accumulation. Further, the implementation of magnitude conversion proceeds according to the invention herein as suggested in FIG. 2L, which is considered capable of direct and clear interpretation without any experimentation by one skilled in the art in view of the material herein without further detailed explanation.

Figure 2M:

Further, according to the invention, magnitude convert accumulation and magnitude convert double cycle are capable of performance and operation in accordance with FIGS. 2M and 2N as viewed in the context of the explanatory material already set forth above with regard to the implementation of other operations.

Finally, the implementation of real accumulation is shown in FIG. 2O.

Figure 3B:
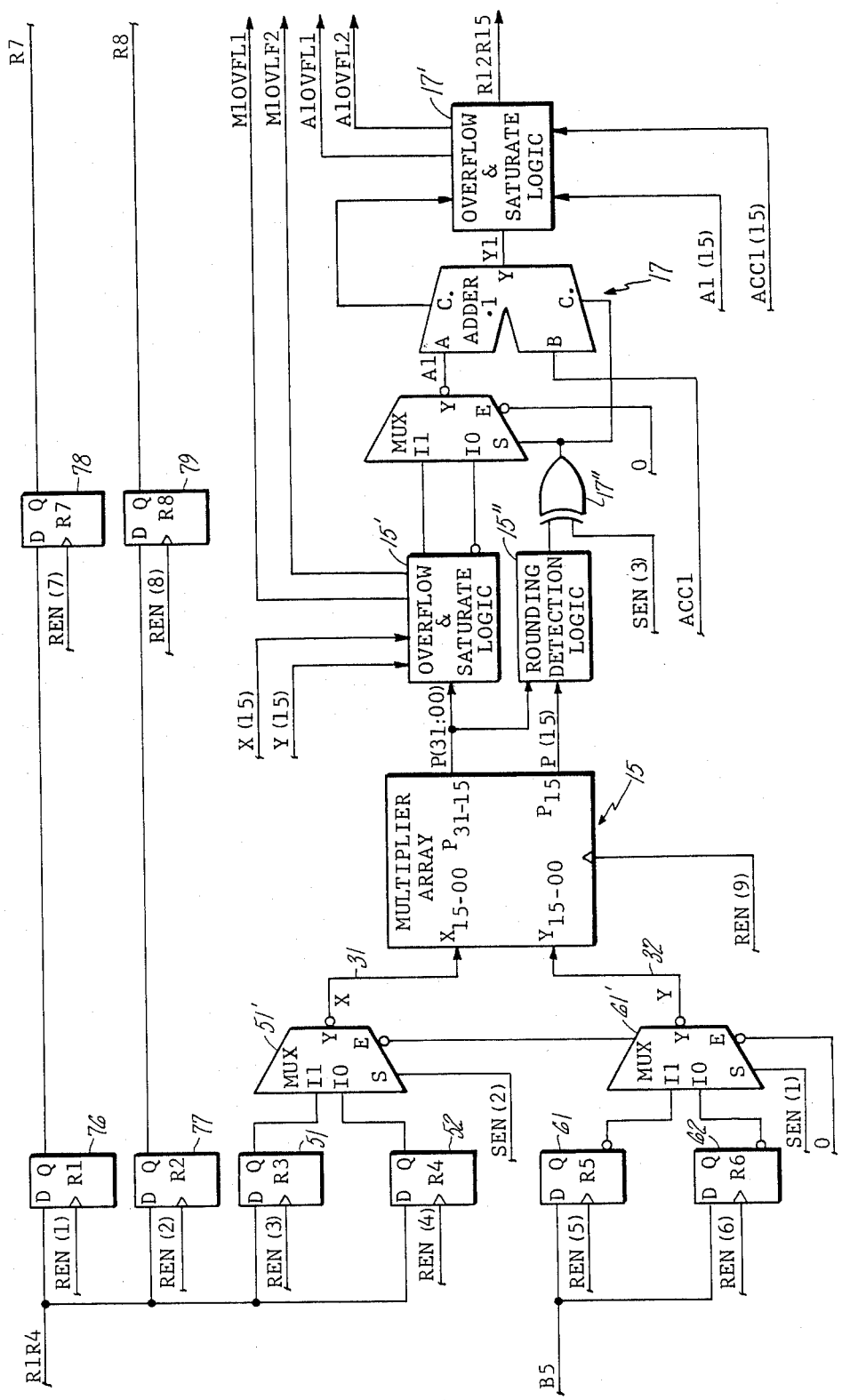

In order to provide even greater detail of the construction and implementation of the invention herein, the detail shown in FIGS. 3A through 3D is set forth as follows. In particular, FIG. 3A shows a detail of the input multiplexer 95, which is as can be seen a 4 by 1 multiplexer constructed by the use of three subsidiary two by one multiplexer elements 95'. Four inputs B1 through B4 to the overall multiplexer arrangement 95 are shown. Further shown in FIG. 3A is the divider arrangement 90 at the output of multiplexer 95. As already noted, the output of the divider arrangement 90 is capable of being directed to feed the entire amount or one half of a selected input value or number to selected ones of input registers R76, R77, R51 and R52 as shown in FIG. 1, depending upon whether or not divider 90 is enabled under direction of controller 13'. By way of further detail, the 4 by 1 multiplexer is 16 bits wide according to a preferred embodiment of the invention and the divider 9 is also 16 bits wide. The function of the multiplexer is to select one of buses B1 through B4, and to provide an optional divide by two opportunity, and then to route the results of the operation to the arithmetic section shown in significant detail in FIGS. 3B and 3C. As shown, multiplexer 90 and divider 90 respectively have further input lines among them being a DIR and a DIV input. These signals are generated externally under direction of controller 13'. Even another input signal is INBUS_SEL, and this signal is established and modified by the internal logic control as set forth herein. The DIV signal is an enable signal to the divider 90 and in construction is the same as dividers 90 to be discussed below in greater detail in regard to the arithmetic section.

The first portion of the arithmetic section as shown in FIG. 3B particularly shows a number of input registers R1, R2, R3, R4, R5 and R6, which are respectively also designated by the numbers 76, 77, 51, 52, 61 and 62 as already discussed above. As further already suggested in FIG. 1, the output of register R1 is connected electrically to the input of register R7, these registers also being respectively designated 76 and 78. Similarly, register R2 is connected at its output to register R8, these in turn respectively being designated by numbers 77 and 79. Registers 51 and 52 are connected at their respective outputs to output multiplexer 51' which is represented merely as a node in much more generally specified FIG. 1. FIG. 3B actually shows multiplexer 51' with its output being line 31. The same holds for registers R5 and R6 which at their respective outputs are connected to a multiplexer 61' and the output of the multiplexer 61' is line 32. As already suggested, lines 31 and 32 are inputs to multiplier 15. The multiplexers 51' and 61' at the outputs of registers R3, R4, R5 and R6 are further controlled by so-called "SEN" signals as shown in FIG. 3B. The enables to these multiplexers 51' and 61' are set to zero under all circumstances. The outputs of multiplier 15 particularly lead to overflow and saturate logic elements 15' and to rounding detection logic elements 15" as will be discussed below. Further, first adder 17 which follows multiplier 15 also has its own arrangement for overflow and saturate logic 17' at the output thereof. By way of further detail regarding a preferred embodiment of the invention, the arithmetic section consists of sixteen 16 bit data registers, a first and an by 16 multiplier 15, a 16 bit comparator 21, two 16 bit additional 16 bit adder, respectively 17 and 19, a 16 dividers 90, thirteen 16 bit multiplexers and other indicated circuitry. The arithmetic section is controlled by signals generated in controller 13' as discussed herein. The signals REN are clock signals used to move data through the several data registers indicated.

As is further already apparent, the data registers provide intermediate data storage required for operation of complex arithmetic. In particular, registers R12 and R13 are used for temporary holding registers during complex multiplication. Further, these two register R12 and R13 are used as 16 bit accumulators for complex multiply accumulate functions. Further, register R17 provides temporary storage for magnitude conversion functions and is also used as an accumulator for real arithmetic functions. Register R17 is additionally a sole output element for the arithmetic section. Register R17 is additionally used as a 16 bit accumulator for magnitude conversion accumulate and real accumulate functions.

By way of even further detail, the adders 17 and 19 are effective for conducting either addition or subtraction upon two 16 bit twos complement numbers. In particular, addition is performed with an input carry bit at logic zero. Subtraction is performed by adding the minuend to the ones complement of the subtrahend and setting input C1 to the adder to logic 1 by for example appropriately setting signal SEN (3) through exclusive or gate 17''. This ones complement data is readily available since the registers which supply most inputs to the adders feature true and complement outputs. By way of further detail, the first adder 17 is used for complex multiply, complex multiply accumulation, and Radix-two butterfly functions. The other or additional adder 19 is used for magnitude conversion, magnitude conversion accumulation, real accumulation and Radix-two butterfly operations.

The multiplier 15 is effective for computing the product of two 16 bit twos complement numbers. This is accomplished by combinational logic in an asynchronous manner according to well-known schemes. Only the upper 7 bits of normal 17 bit products are required, and thus the output bits from the multiplier 15 are aligned so that the most significant bits of the multiplicand and product all have the same value. The total delay between registers R3 and R12 is not to exceed two clock cycles according to a preferred version of the invention herein.

Figure 3C:
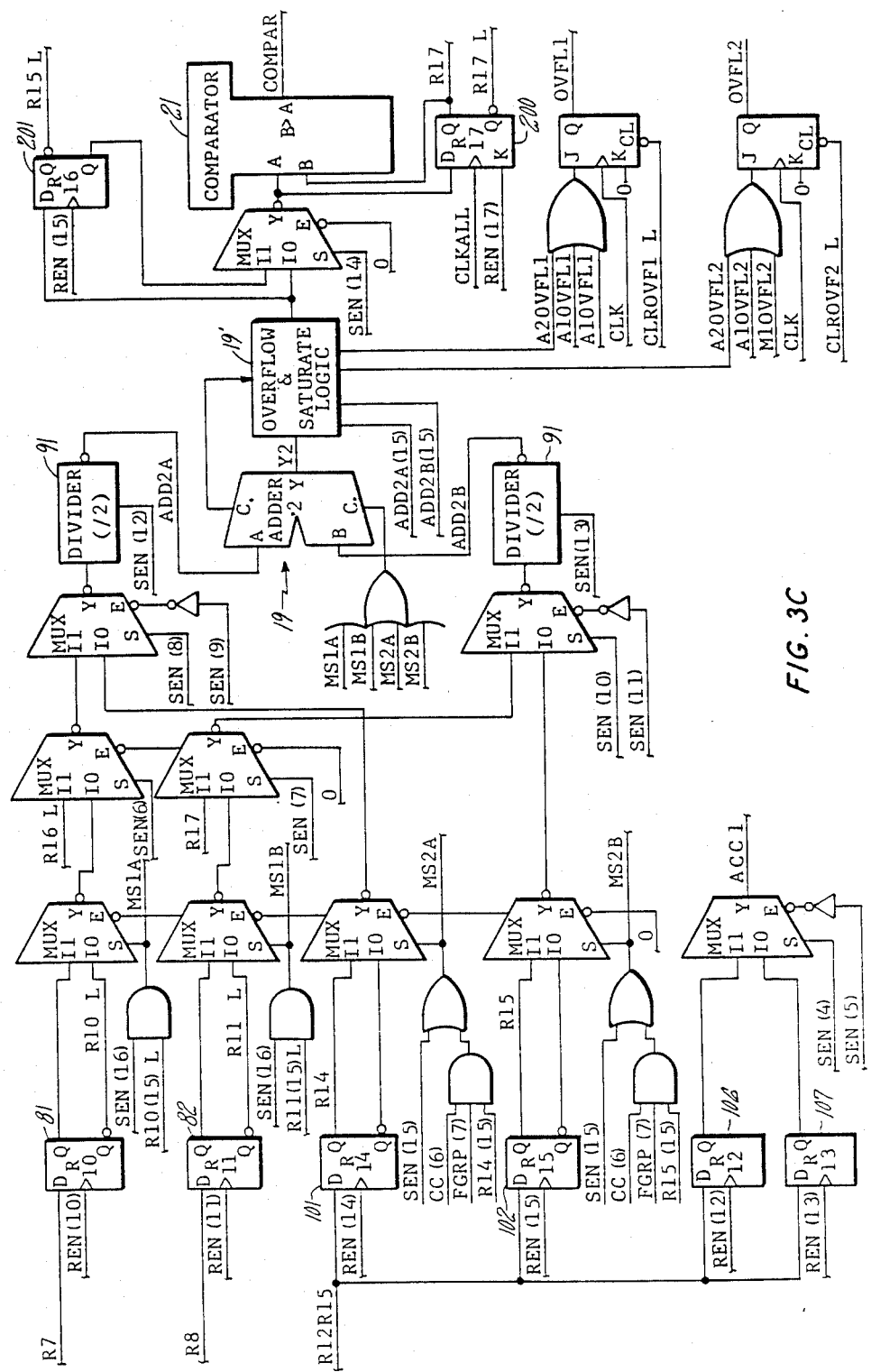

The comparator 21 in FIG. 3C herein compares two 6 bit unsigned numbers. Actual data input to the comparator 21 consists of inverted positive twos complement numbers preceding register R16, negative numbers having been converted to positive numbers by adding one with the additional adder 19 to the ones complement of the number being subtracted. This ones complement data is readily available since those registers which can supply negative data values for the comparator, in other words, registers R10, R11, R14 and R15, feature both true and complement outputs. The comparator output is sent to controller 13'. This output is at logic one when the data at the output of register R17 is greater than the data on its inputs. Divider 90 operation is accomplished by the use of a 16 bit wide two by one multiplexer which performs a one bit arithmetic shift right operation, thereby yielding in the selected case an output equal to one half of the input. When the divider enable input is set to logic one, division is enabled. When this input is at a logic zero, the data passes through the divider unshifted. Data from the divider 90 is inverted irrespective of the state of its control bit. Divider 90 at the input of arrangement is with the multiplexer 95 is used for input data scaling, while the dividers 90 in the arithmetic section are used for accomplishing magnitude convert operation.

The overflow and saturation logic circuitry 15' is operational when a numerical overflow occurs, which happens when the result of an arithmetic operation exceeds the number system defined for the particular portion of arrangement 13. There are two types of overflows that are detected in the arrangement invented herein, namely normal and block floating point operation.

Normal overflow as suggested by a signal OVFL1 is detected when the result of an arithmetic operation exceeds 16 bit number capacity. In this case, the resultant data must be forced or saturated to a maximum number allowed by the number system, with a sign of the result consistent with that of the input operand and the operation performed. Positive overflow is considered to be saturated at a value of 7FFF, while 8000 is used to indicate negative overflow.

When performing a Fast Fourier transform (FFT) operation such as the Radix-two butterfly, it is advantageous to use a 15 bit data word with a two bits of sign extension. This allows for an extra bit of data growth on each pass. A block floating point overflow as suggested by signal OVFL2 is detected when the result of an arithmetic operation grows into the 15th bit position. Since there is no need for data saturation with this overflow type, the number system will not be exceeded. Due to the nature of twos complement mathematics, the multiplier may experience what is considered to be normal overflow, when conducting multiplication with the maximum possible negative number, which is 8000 multiplied by itself. A result of 7FFF should accordingly be the final multiplier output.

Data rounding in rounding detection logic 15'' is required whenever bits are discarded pursuant to an arithmetic operation. All rounding used in the arrangement invented herein employs a type of zero bias rounding known as ROM rounding. According to this technique, as is well known, the lower "W" bits of the number to be rounded are discarded. "W plus one" bits then feed the address inputs of a ROM. The ROM adds a one to the upper "W" address bits, if the least significant bit input is equal one. Otherwise, the upper W bits are simply passed through the ROM. In the event that the upper "W" inputs are all 1s, these bits are simply passed through the ROM. Implementation of this technique takes several forms. In particular, when W is equal to one, a simple OR gate suffices. This implementation is used for the dividers 90. The multiplier 15 in effect adds a one via the carry-in input 1 of an adder 17. FIG. 3D shows a block diagram of an output section of the arithmetic portion of the arrangement.

Controller 13', according to the invention herein, preferably comprises a clock driver phase splitter, an input control register and selected combinatorial logic (not shown). The function of the control logic is particularly to generate signals needed to control the operation of the invented arrangement herein.

The arrangement herein preferably operates from a single voltage supply of five volts DC. Maximum power dissipation is one microwatt per megahertz per gate over the full operational temperature range. A maximum clock rate of 6.5 megahertz over the full operating range is indicated according to a preferred embodiment of the invention.

Figure 4A:
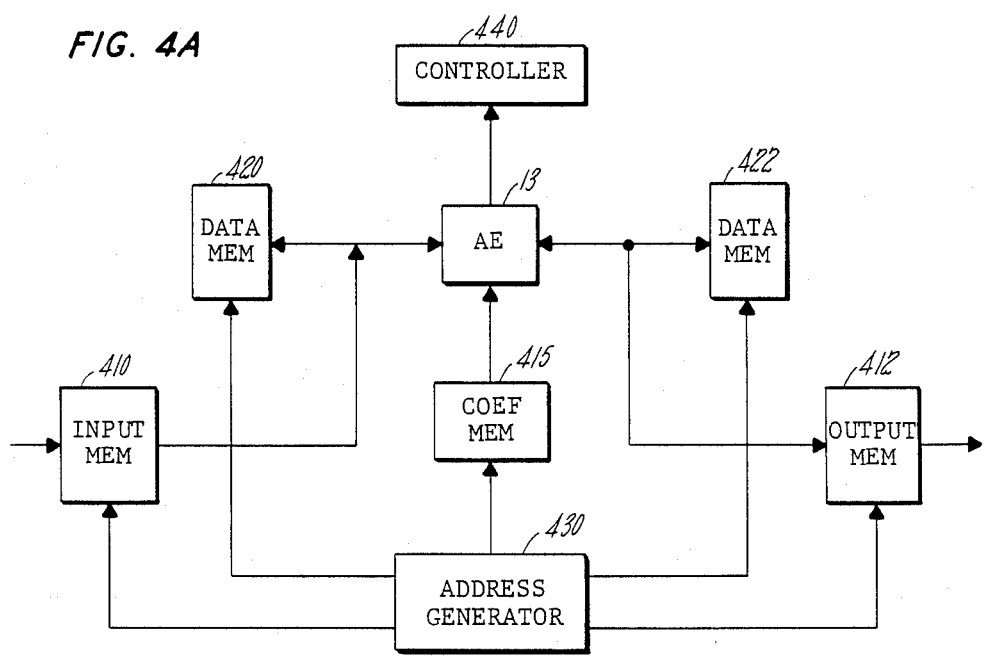
FIGS. 4A, 4B and 4C show systolic schemes which include a matrix of complex arithmetic arrangements, according to the invention herein.

Referring now to FIG. 4A, there is shown a very simple system applying the invention. Cape chip 13 is bracketed by memories 420 and 422, illustratively RAMs for holding variable data, and is also connected to PROM 415 for holding constants. Flow control through the chip, timing signals and other overhead operations are handled by controller 440, illustratively a finite state machine. Memory control is provided by address generator 430, also controlled by controller 440. Optional buffers 410 and 412 serve as interfaces between the arithmetic system described above and external devices. This system can perform a Fast Fourier Transform (an eight point operation) by looping the data eight times through the CAPE, taking advantage of the bidirectional operation of the CAPE to avoid the necessity of a data path from the output back to the input.

As noted above, FIG. 4B shows several complex arithmetic elements 13 according to the invention, each of which can be implemented as a single semiconductor chip, as for example with a gate array in which the top several layers are selectively customized, according to the invention herein, the several elements 13 being interconnected with other such elements 13 in a systolic array 99 that is a two-by-two matrix. The array 99 need not be symmetric; larger matrices can be connected. As is well known, systolic arrays generally permit operations to be conducted upon data and/or information without returning the results repeatedly to memory after each operation is completed. The solid and dotted lines indicate which buses are used for input and which for output in the first and second halves of an operation cycle. In a systolic array as shown, the need for buffer register is eliminated by arranging the timing such that a chip is ready to receive data when the preceding chip is ready to send it. The multiplexes are switched by the on-chip controller from one bus to another.

Figure 4B:
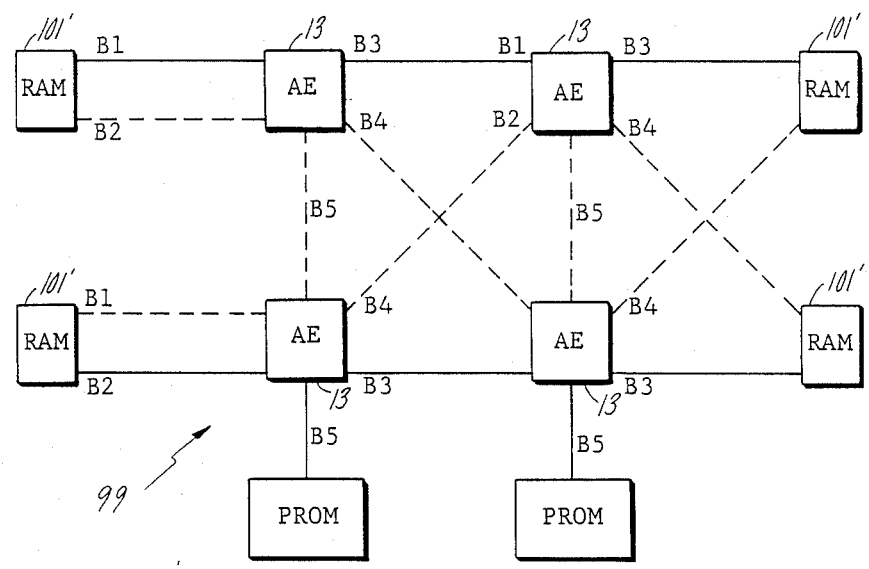
Figure 4C:
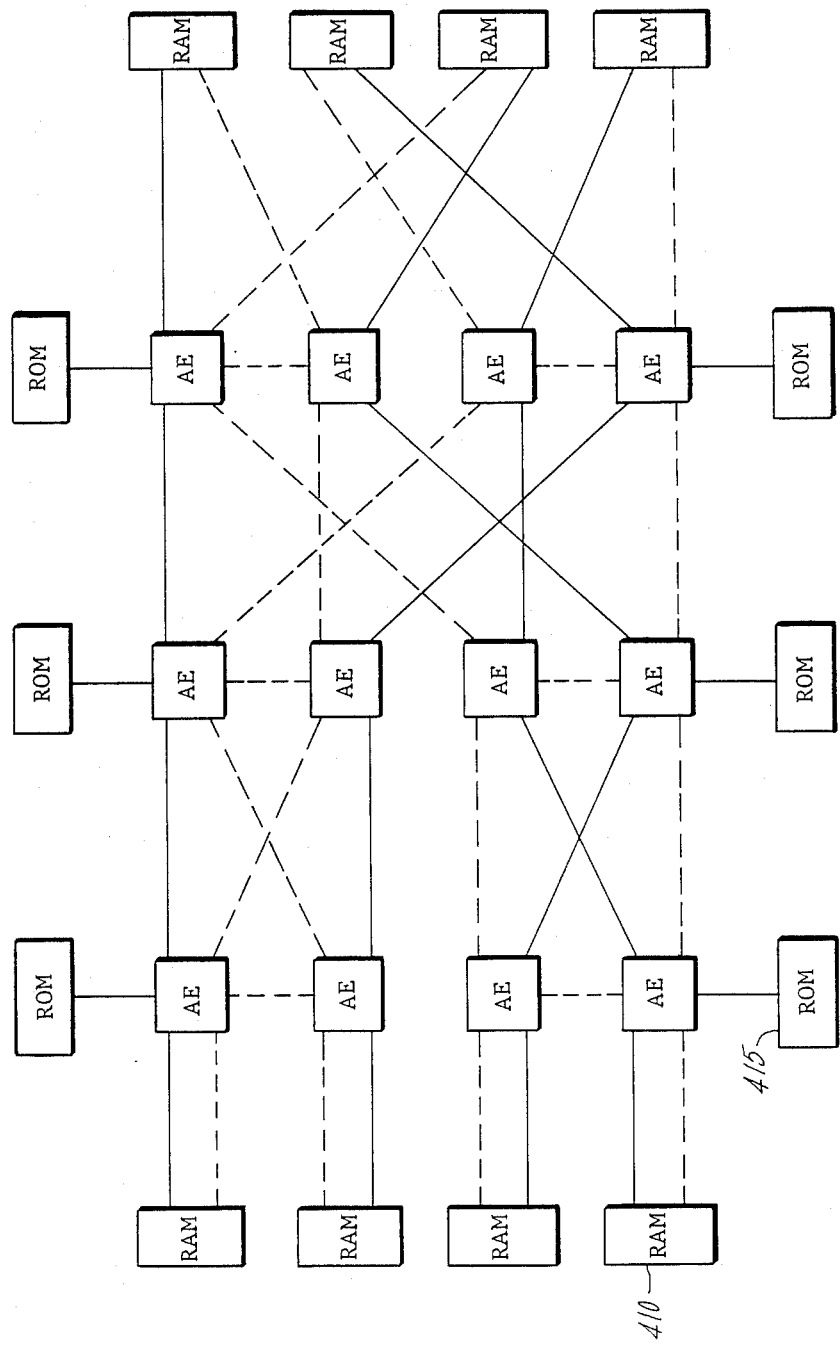

Referring now to FIG. 4C, there is shown a 4×3 systolic array constructed according to the invention that can perform an FFT in a single pass radix 8 operation.

The invention herein is directed in part toward the timing restrictions and requirements involved in such systolic arrays. Further, the invention is directed toward the interconnection scheme which is effective for implementing these timing requirements.

An advantageous feature of the invention is that all timing and bus interconnects are synchronized to allow direct connection.

Each chip 13 as already indicated above has two input buses selected from B1 through B4 and two output buses selected from the same set of buses B1 through B4. The input buses B1 through B4 of each chip 13 are either connected to memory 101 (in this case RAM memory) or to selected adjacent or diagonal elements of the systolic arrangement 99. In operation, and particularly according to the invention, first one of the input buses is operational and then the other. This is particularly suggested in FIG. 5 and FIGS. 6A and 6B.

A detailed description of FIG. 5 is provided as follows. As suggested elsewhere herein, each element 13 is operable in a selected one of two directions "DIR" which can be represented by the binary symbols 0 and 1. When a particular one of elements 13 is operating in the forward direction ("DIR equals 0", for example), the input buses are designated or considered to be B3 and B4. When the element 13 is operating in the remaining or reverse direction (with "DIR" for example, set to "1"), the input buses are correspondingly designated or considered to be buses B1 and B2.

Having defined the directional operation of the chip over time, the chip operates successively in MODE "0" and MODE "1" as suggested in FIG. 5. During initially designated cycles "CYC" 3 and 0, the input bus is B3 for example and during subsequent cycles "1" and "2" under conditions of MODE equals 0, the input bus is B4 as can be seen on the right column of FIG. 5, which designate which of buses B1 through B4 is the designated input bus for that cycle of operation, under particular conditions of direction "DIR" and mode "MODE". During the remaining cycles of operation under the particular mode first considered in this discussion (i.e., MODE equals 1) of direction "DIR equals 0", and particularly while cycles 3 and 0 are being performed, the input bus is designated to be B4 as can be seen further down in the INPUT BUS column of FIG. 5, and during cycles 1 and 2 of mode 1 thereafter, the input bus is B3.

In the systolic array 99 shown in FIG. 4B, the bottom two elements 13 operate in one mode, and the top two elements 13 operate in the other mode, by necessity and according to the invention herein.

Figure 6A:
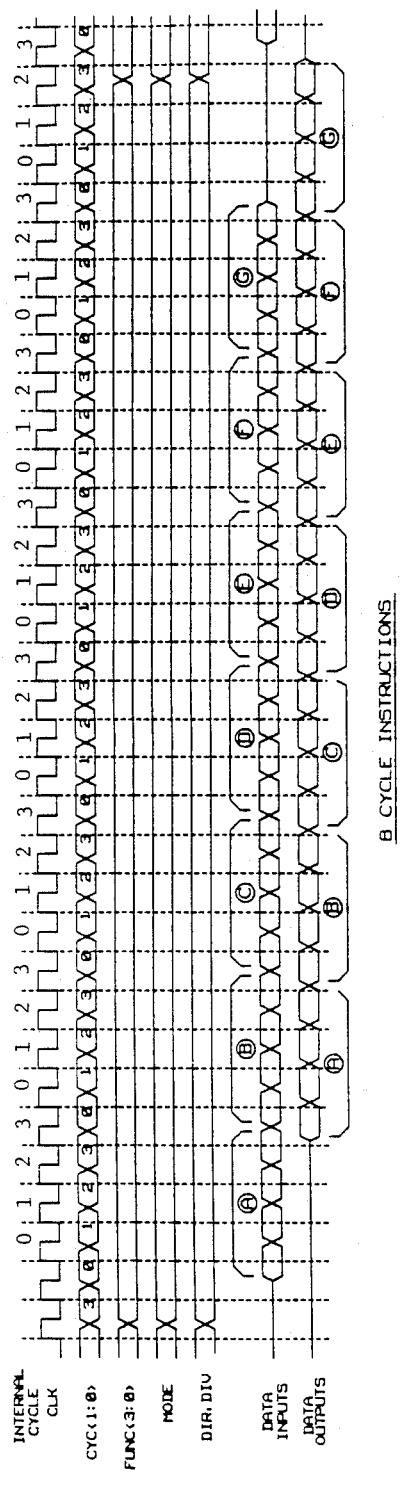
FIG. 6A and 6B show respective timing diagrams for eight cycle and twelve cycle operation according to the invention herein, the respective wave forms being indicative of internal clock cycle, CYC, function, mode, direction or division, data input and data output control signal levels.
Figure 6B:
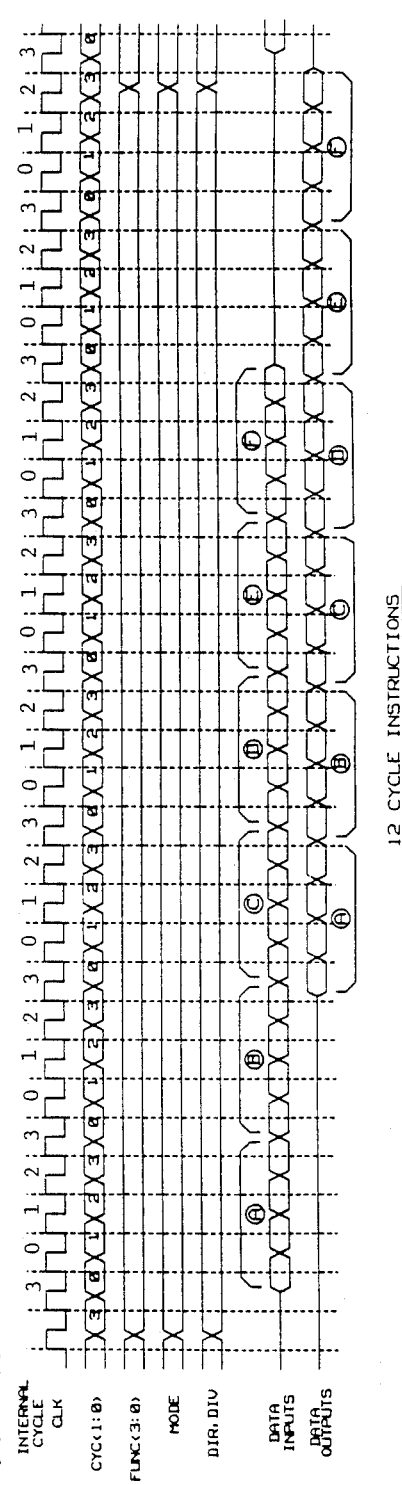

During steady state operation, each element 13 is generally inputting and outputting data at the same time as shown in FIG. 6A and 6B. In short, during one portion of a particular cycle, each particular element 13 is using one of its two designated inputs, and during the other portion of the cycle it is in an input state with respect to the other of the two inputs.

Those skilled in the art will appreciate the foregoing and other features of the invention with the further assistance of "Complex Arithmetic Processing Element Device Specification", United Technologies Norden Systems 174200 incorporated herein by reference.

It should be understood that the invention is not limited to the particular embodiments shown and described herein, but that various changes and modifications may be made without departing from the spirit and scope of this novel concept as defined by the following claims.

What is claimed is:

1. An arrangement for performing complex arithmetic comprising:
   (a) input register means for receiving along a selected set of bidirectional input buses the real and imaginary portions of selected complex numbers to be arithmetically processed;
   (b) multiplexer means connected to at last two of said input buses for passing input data from a selected input bus to a selected register on one of at least two data paths;
   (c) multiplier means for separately multiplying portions of one of said selected complex numbers with portions of another of said numbers, said multiplier means comprising a multiplier register means for receiving the results of said multiplication;
   (d) first adder means for conducting addition operations, said addition operations including addition and subtraction of the results of multiplication, said first adder means further comprising first adder output register means for receiving the results of addition by said first adder means;
   (e) additional adder means for conducting such addition operations including addition and subtraction, said additional adder means comprising additional adder inputs connected to said input register means for receiving the real and complex portions of selected input complex numbers, and also connected to said first adder output register means for conducting addition operations thereupon, said additional adder means further comprising additional adder output register means for controllably storing selected results of addition operation by said additional adder means; and
   (f) control means for controlling the flow of data through said input register means, said multiplier means said first adder means and said additional adder means in at least two modes to perform at least two complex arithmetic operations.

2. The arrangement of claim 1, said first adder means further including a first accumulation register means for storing results of addition operations by said first adder means, said first accumulation register means being effective for controllably feeding back the contents thereof as an input to said first adder means, whereby accumulation of the results of addition operation in said first adder means is enabled.

3. The arrangement of claim 1, further including a second accumulation register means for registering selected results of addition operation by said additional adder means, said second accumulation register means being effective for controllably feeding back the contents thereof as an input to said additional adder means.

4. The arrangement of claim 1, wherein each of said additional adder inputs includes means for dividing an input number to said additional adder means by a predetermined value.

5. The arrangement of claim 1, wherein said additional adder output register means includes a pair of registers and the contents of one is transferable into the other.

6. The arrangement of claim 1, further comprising a comparator means for comparing the output of said additional adder means with the contents of one of said additional adder output register means.

7. The arrangement of claim 1, further comprising a comparator means for comparing the respective contents of said additional adder output register means.

8. An arrangement for performing complex arithmetic comprising first, second, third and fourth complex arithmetic means for performing complex arithmetic operations, each of said means including first and second inputs and first and second outputs, said first inputs and outputs being active when said second inputs and outputs are not active, and said second inputs and outputs being active when said first inputs and outputs are not active, the first output of the said first means being connected to the first input of said second means, the second output of said first means being connected to the first input of said third means, both of the inputs of said first and fourth means being connected to a source of variable complex numbers and said second input of said second and third means being connected to said fourth means, whereby said first, second, third and fourth means combine to form a systolic processing array.

9. The method of implementing a Radix-two butterfly operation in complex arithmetic with selected first and second variable complex numbers and a predetermined fixed complex number, with an arrangement comprising an input register, a multiplier, a first adder and an additional adder, a multiplier register, a first adder output register including first and second feedback portions, and an additional adder output register means, comprising the step of
  (a) receiving portions of the selected numbers at corresponding portions of the input register arrangements;
  (b) establishing a selected cross product and a selected same product of the variable ones of said complex numbers to form a first cross product of portions of said variable complex numbers and a first same kind of product thereof;
  (c) established a remaining cross product and a remaining same product of the variable ones of said complex numbers to form a second cross product of portions of said variable complex numbers one of said first same kind product and second same kind product being formed from real input numbers and being a real same kind product and the other of said first and second same kind product being formed from imaginary input numbers and being an imaginary same kind product;
  (d) subtracting said real same product from said imaginary same product;
  (e) adding said first and remaining cross products, and storing the results of addition and subtraction in respect portions of the first adder output register; and
  (f) finally adding and subtracting the results of said addition and subtraction, from respectively the real and imaginary parts of said fixed complex numbers, and producing the results of said final additions and subtractions.

10. The method of claim 9, wherein the respective results of said first same and cross products are stored in respective feedback portions of said first adder feedback portion for accumulation with corresponding ones of said remaining same kind products and said cross products.

11. An integrated circuit arithmetic chip for performing selected real and complex arithmetic operations on multi-bit arithmetic data and comprising:
  input means including a set of input terminals;
  output means including a set of output terminals;
  multiplier means;
  first adder means, connected to said multiplier means;
  second adder means connected to said first adder means by signal transfer means;
  a data path through said chip from an input bus terminal through said multipler, said first adder means and said second adder means to an output bus terminal; and
  control means for controlling data flow within the chip to perform a fast Fourier transform, characterized in that:
  said input means and said output means share at least two bidirectional bus terminals;
  said data path includes multiplexer means for connecting said at least two bidirectional bus terminals to selected units within said chip;
  a second data path extends through said chip from said multiplexer means through said second adder means to said output means;
  said control means includes means for controlling data flow along said second data path, means for performing signal transfer operations and data manipulation operations simultaneously on units located along said data path and along said second data path, and means for controlling data flow within said chip to perform at least one arithmetic operations in addition to a fast Fourier transform; and
  said control means includes direction control means for dynamically controlling said multiplexer means and said output means to alter the direction of data flow along said bidirectional bus terminals, whereby said chip has the capability to alternately receive and transmit data along the same bidirectional bus terminals, thereby facilitating the ability of the chip to perform more than one function in a processing system.

12. An integrated circuit according to claim 11, further characterized in that both said data path and said second data path are divided into first and second data sub-paths, said first sub-paths of both said data path and second data path being connected to a first input of said second adder means and said second sub-paths of both said data path and said second data path being connected to a second input of said second, adder means, whereby said second adder means has the capability to add data from either or both of said data path and said second data path.

13. An integrated circuit according to claim 11, further characterized in that each of said first and second inputs of said second adder means includes selectable means for either passing data through to said input of said second adder means or dividing data input to said second adder means by a factor of two before passing said data input through to said input of said second adder means.

* * * * *